United States Patent
Nagumo

(10) Patent No.: US 9,985,493 B2
(45) Date of Patent: May 29, 2018

(54) COOLING STRUCTURE FOR STATOR

(71) Applicant: HONDA MOTOR CO., LTD., Tokyo (JP)

(72) Inventor: Toshiyuki Nagumo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 228 days.

(21) Appl. No.: 15/135,554

(22) Filed: Apr. 22, 2016

(65) Prior Publication Data

US 2016/0315518 A1    Oct. 27, 2016

(30) Foreign Application Priority Data

Apr. 24, 2015 (JP) .................. 2015-089149

(51) Int. Cl.
*H02K 9/00* (2006.01)
*H02K 5/20* (2006.01)
*H02K 9/19* (2006.01)

(52) U.S. Cl.
CPC .............. *H02K 5/20* (2013.01); *H02K 9/19* (2013.01)

(58) Field of Classification Search
CPC .. H02K 5/20; H02K 9/19; H02K 1/20; H02K 1/32
USPC .............. 310/52–54, 58–59, 88–89
See application file for complete search history.

(56) References Cited

U.S. PATENT DOCUMENTS

| | | | | |
|---|---|---|---|---|
| 7,576,458 B2* | 8/2009 | Wehner | .......... | H02K 5/20 310/52 |
| 8,760,015 B2* | 6/2014 | Himmelmann | ........ | H02K 9/197 310/58 |
| 2007/0210655 A1* | 9/2007 | Bahr | .......... | H02K 5/20 310/54 |
| 2012/0267969 A1* | 10/2012 | Iwamoto | .......... | H02K 5/15 310/54 |
| 2014/0117796 A1* | 5/2014 | Kassler | .......... | H02K 5/20 310/54 |

(Continued)

FOREIGN PATENT DOCUMENTS

| | | |
|---|---|---|
| JP | 08-237904 | 9/1996 |
| JP | 2010-57260 | 3/2010 |

(Continued)

OTHER PUBLICATIONS

Japanese Office Action for corresponding JP Application No. 2015-089149, Dec. 6, 2016 (w/ English machine translation).

*Primary Examiner* — Thanh Lam
(74) *Attorney, Agent, or Firm* — Mori & Ward, LLP

(57) ABSTRACT

A housing includes a housing center axis, a first end surface, a second end surface opposite to the first end surface in a direction of the housing center axis, a housing large inner peripheral surface, a housing small inner peripheral surface, and a housing step surface connecting the housing large inner peripheral surface and the housing small inner peripheral surface to face toward the first end surface. A stator holder includes an annular wall, a first flange fixed to the housing so that the first flange surface contacts the first end surface, and a second flange having a second flange second surface which faces the housing step surface. A annular sealing member is provided between the second flange second surface and the housing step surface to be pressed toward the second end surface via the second flange.

10 Claims, 6 Drawing Sheets

(56) References Cited

U.S. PATENT DOCUMENTS

2015/0381010 A1* 12/2015 Kobes ..................... H02K 5/20
                                                                                      310/54

FOREIGN PATENT DOCUMENTS

| JP | 2011-103750 | 5/2011 |
| JP | 2013-141334 | 7/2013 |
| WO | WO 2013/054811 | 4/2013 |
| WO | WO 2014/199516 | 12/2014 |

* cited by examiner

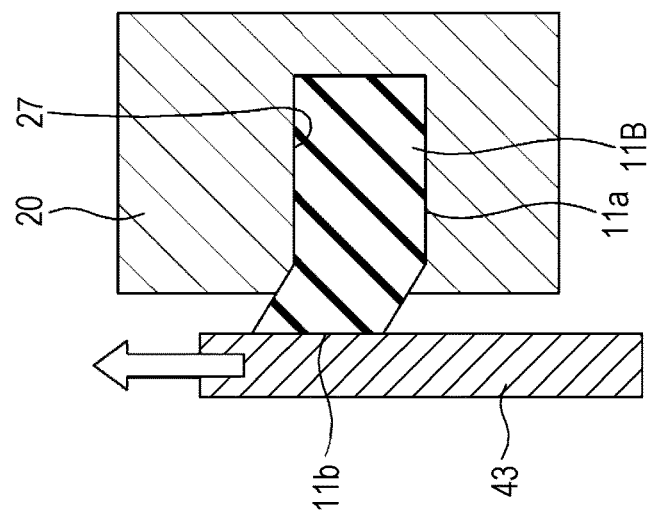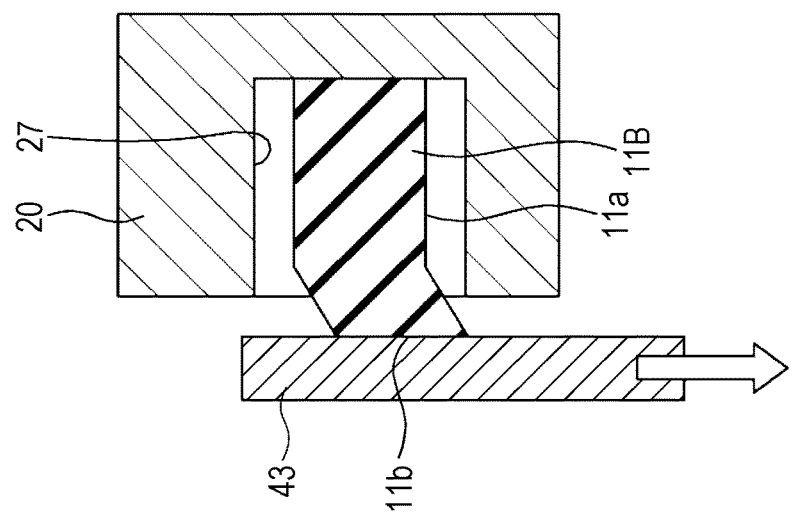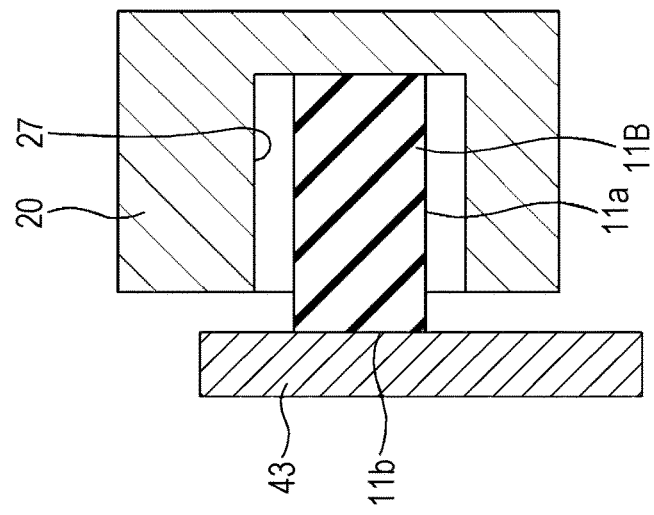

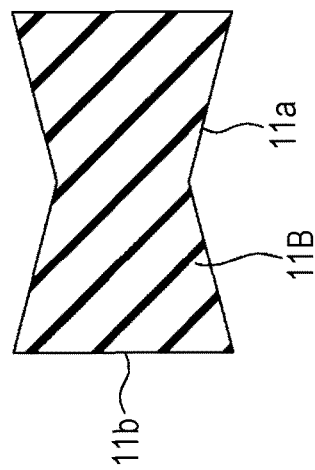
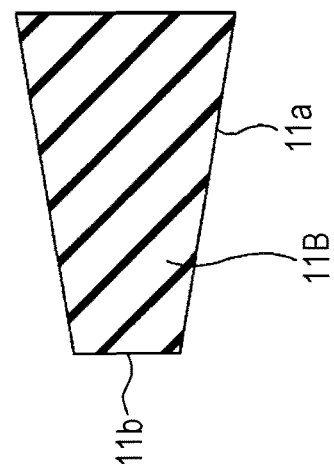
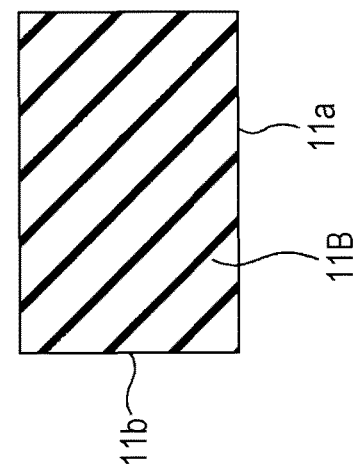

COOLING STRUCTURE FOR STATOR

CROSS-REFERENCE TO RELATED APPLICATIONS

The present application claims priority under 35 U.S.C. § 119 to Japanese Patent Application No. 2015-089149, filed Apr. 24, 2015, entitled "Cooling Structure for Stator". The contents of this application are incorporated herein by reference in their entirety.

BACKGROUND

Field of the Invention

The present disclosure relates to a cooling structure for a stator.

Discussion of the Background

FIG. 6 illustrates an existing rotating electric machine 100 including a front housing 102 and a rear housing 104 (see, for example, Japanese Unexamined Patent Application Publication No. 8-237904). The front housing 102 is shaped like a cylinder with a closed bottom and holds a stator 101 therein. The rear housing 104 is shaped like a cylinder with a closed bottom and is fitted onto the front housing 102 with O-rings 103 therebetween. The O-rings 103 seal a cylindrical space 105 between the front housing 102 and the rear housing 104.

SUMMARY

According to one aspect of the present invention, a cooling structure for a stator includes a housing; a stator core disposed in the housing; a stator holder including a cylindrical portion that holds the stator core on an inner peripheral part thereof, and a flange that is disposed on the cylindrical portion near one end in an axial direction and that is fixed to the housing by using a fastening member; and a coolant channel that is surrounded by an outer peripheral part of the cylindrical portion, an inner peripheral part of the housing, and the flange. The flange is in contact with and fixed to a surface of the housing near the one end in the axial direction so as to face the surface in the axial direction. An annular sealing member is disposed between a surface of the stator holder near the other end in the axial direction and an inner wall of the housing near the other end in the axial direction. In a state in which the flange is in contact with and fixed to the surface of the housing near the one end in the axial direction by using the fastening member, the surface of the stator holder near the other end in the axial direction and the sealing member are pressed against each other in the axial direction.

According to another aspect of the present invention, a cooling structure for a stator includes a housing, a stator core, a stator holder, a coolant channel, and an annular sealing member. The housing includes a housing center axis, a first end surface, a second end surface, a large hole, a small hole, and a housing step surface. The second end surface is opposite to the first end surface in a direction of the housing center axis. The large hole extends from the first end surface toward the second end surface along the housing center axis and has a large hole center axis which is substantially coaxial with the housing center axis. The large hole is defined by a housing large inner peripheral surface around the large hole center axis. The small hole extends from the second end surface toward the large hole along the housing center axis to be connected to the large hole and to have a small hole center axis substantially coaxial with the housing center axis. The small hole is defined by a housing small inner peripheral surface around the small hole center axis. The housing step surface connects the housing large inner peripheral surface and the housing small inner peripheral surface to face toward the first end surface. The stator core has a stator center axis and is provided in the large hole so that the stator center axis is substantially coaxial with the housing center axis. The stator has a stator outer peripheral surface around the stator center axis. The stator holder includes an annular wall, a first flange, and a second flange. The annular wall has a holder center axis and a holder inner peripheral surface around the holder center axis. The annular wall has a holder outer peripheral surface opposite to and around the holder inner peripheral surface provided between the housing and the stator core to hold the stator core in the housing. The holder inner peripheral surface contacts the stator outer peripheral surface. The holder center axis is substantially coaxial with the housing center axis. The first flange projects outwardly from the annular wall and has a first flange surface. The first flange is fixed to the housing via a fastening member so that the first flange surface contacts the first end surface of the housing. The second flange is provided opposite to the first flange in the direction of the housing center axis to project outwardly from the annular wall and has a second flange first surface and a second flange second surface opposite to the second flange first surface in the direction of the housing center axis. The second flange second surface faces the housing step surface. The coolant channel is defined by the holder outer peripheral surface, the housing large inner peripheral surface, the first flange surface, and the second flange first surface. The annular sealing member is provided between the second flange second surface and the housing step surface to be pressed toward the second end surface via the second flange.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 4A to 4C illustrate how a sealing member deforms in accordance with thermal expansion difference due to temperature change and maintains a sealed state, FIG. 4A showing a sealed state at a normal temperature, FIG. 4B showing a sealed state at a high temperature, and FIG. 4C showing a sealed state at a low temperature.

FIGS. 5A to 5C are schematic views illustrating various cross-sectional shapes of the sealing member.

DESCRIPTION OF THE EMBODIMENTS

Figure 1:
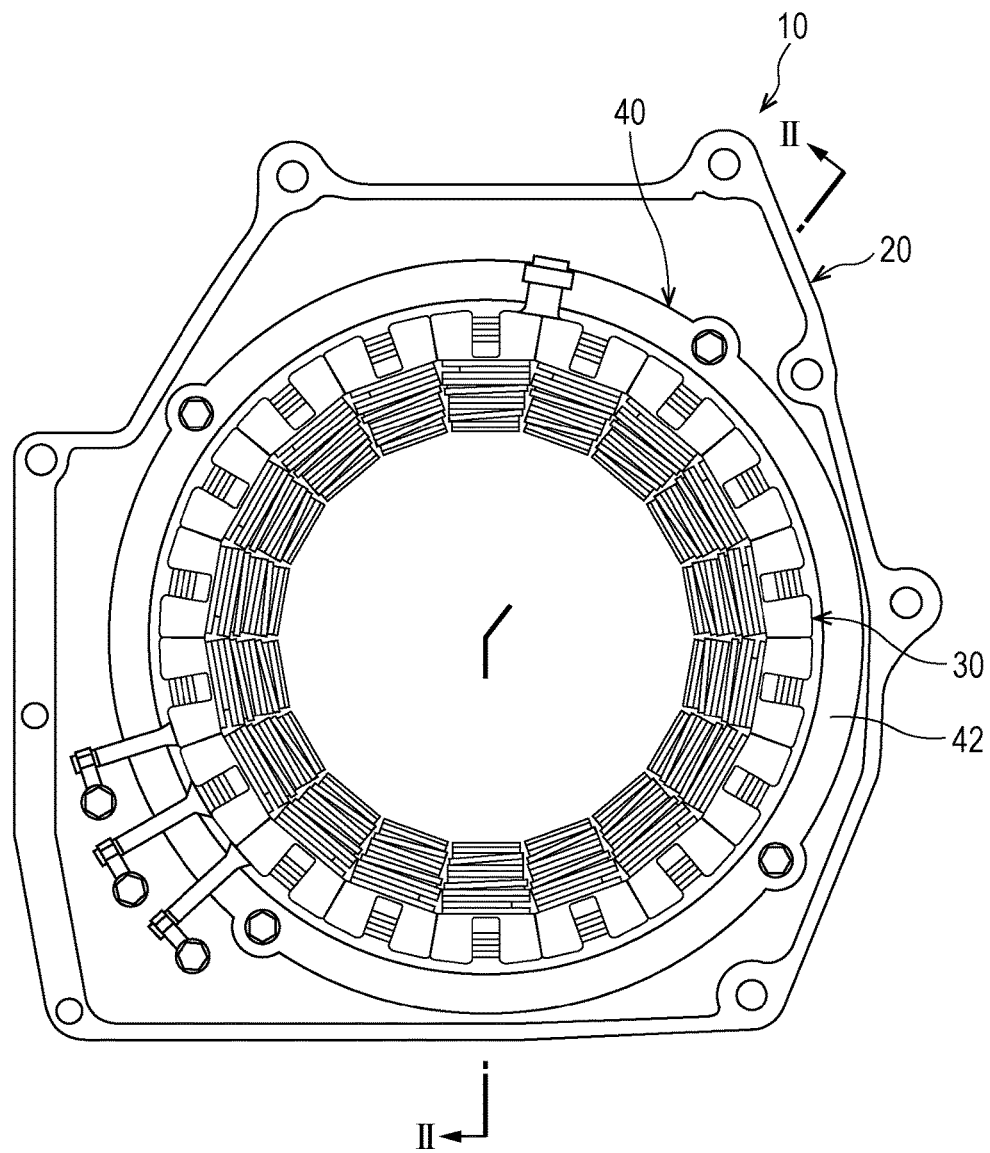
FIG. 1 is a side view of a stator having a cooling structure of a stator according to the present disclosure.

The embodiments will now be described with reference to the accompanying drawings, wherein like reference numerals designate corresponding or identical elements throughout the various drawings.

Hereinafter, an embodiment of the present disclosure will be described with reference to the drawings. The orientations of the drawings are the same as those of the numerals shown in the drawings.

Figure 2:
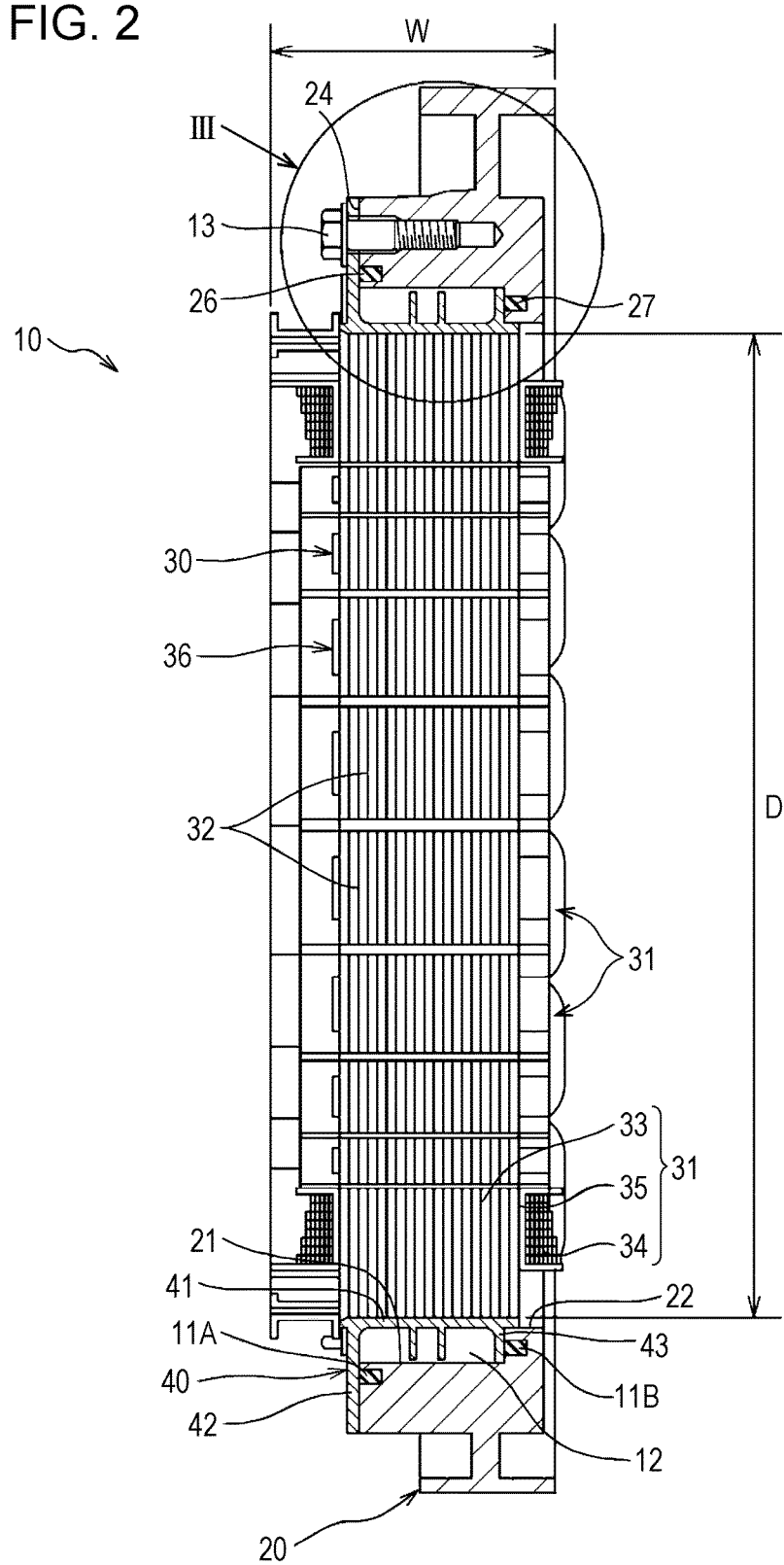
FIG. 2 is a sectional view taken along line II-II in FIG. 1.
Figure 3:
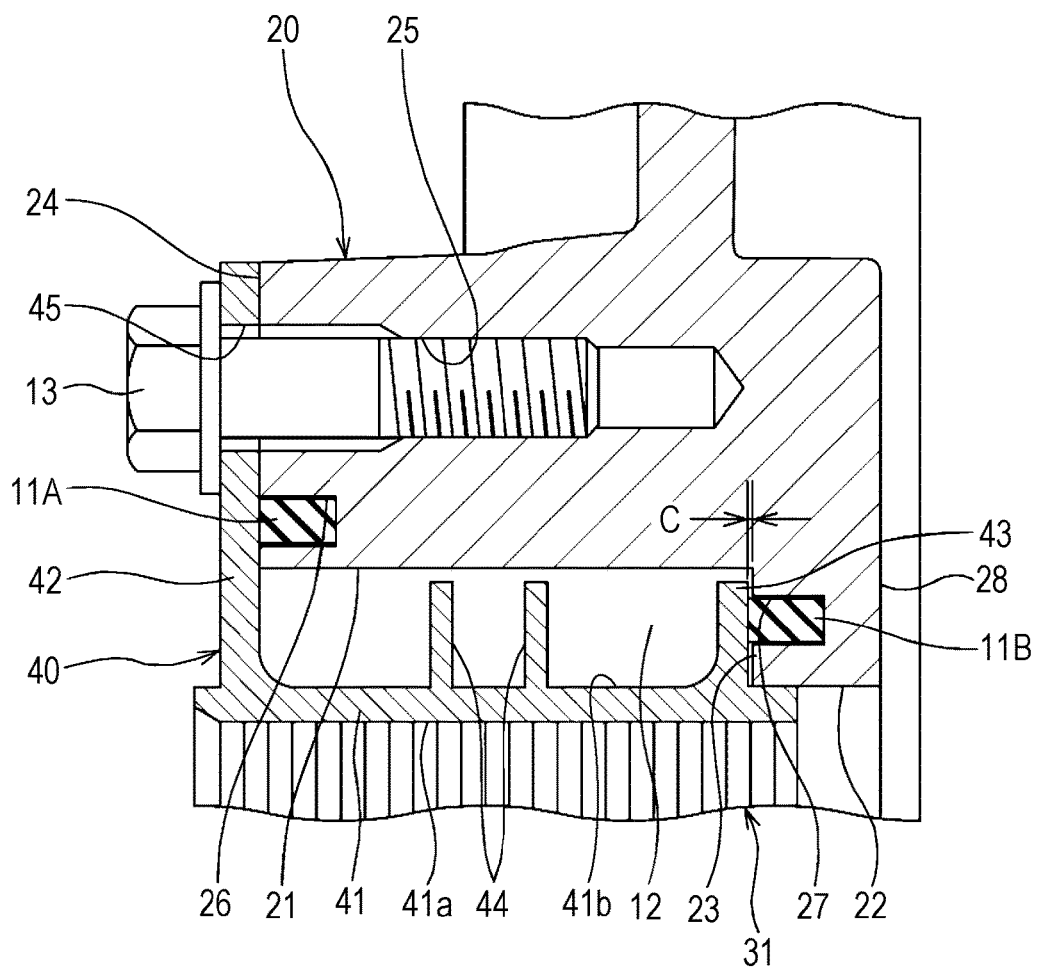
FIG. 3 is an enlarged view of an encircled region III in FIG. 2.

As illustrated in FIGS. 1 to 3, a stator 10 according to the present disclosure includes a housing 20, an annular stator unit 30, and a stator holder 40 that is fitted into the housing 20 and that holds the annular stator unit 30. A coolant channel 12, which is sealed by sealing members 11A and 11B, is formed between an inner wall of the housing 20 and an outer wall of the stator holder 40. A coolant flows through the coolant channel 12 and cools the stator 10.

A large-diameter hole 21 (a large hole 21), for disposing the stator holder 40 therein, is formed in a first end surface 24 of the housing 20. A small-diameter hole 22 (a small hole 22), whose diameter is smaller than that of the large-diameter hole 21, is formed in a second end surface 28 of the housing 20 so as to be continuous with the large-diameter hole 21. A step portion 23 (a housing step surface 23), which extends in the radial direction, is disposed between the large-diameter hole 21 and the small-diameter hole 22.

Internal threads 25 are formed in the first end surface 24 so as to be spaced apart from each other in the circumferential direction. An annular sealing groove 26 is formed in the first end surface 24 so as to be located further inside the internal threads 25 in the radial direction. The sealing member 11A is fitted into the sealing groove 26 so as not to overlap bearing surfaces of bolts 13 that are screwed into the internal threads 25. An annular sealing groove 27, into which the sealing member 11B is fitted, is formed in the step portion 23. The housing 20 is made of, for example, aluminum for weight reduction and forms the outer shell of the stator 10.

The annular stator unit 30 includes a plurality of (for example, eighteen) stator segments 31 that are annularly arranged. Each of the stator segments 31 includes a core portion 33, in which substantially T-shaped electrical steel sheets 32 are stacked, and a coil 34, which is wound around the core portion 33 with an insulator 35 between the coil 34 and the core portion 33. Accordingly, a plurality of the core portions 33 (for example, eighteen core portions 33), which are annularly arranged, constitute a stator core 36.

Referring to FIG. 3, the stator holder 40 includes a cylindrical portion 41, an outer flange 42 (a first flange 42), and an inner flange 43 (a second flange 43). The outer flange 42 is disposed on a part the cylindrical portion 41 near one end in the axial direction so as to extend outward in the radial direction. The inner flange 43 is disposed on a part of the cylindrical portion 41 near the other end in the axial direction so as to extend outward in the radial direction. The length of the outer flange 42 in the radial direction is greater than the length of the inner flange 43 in the radial direction. The annular stator unit 30 is (the stator segments 31 are) press-fitted into and fixed to an inner peripheral surface 41a (a holder inner peripheral surface 41a) of the cylindrical portion 41. Annular ribs 44 are disposed between the outer flange 42 and the inner flange 43 so as to extend from an outer peripheral surface 41b (a holder outer peripheral surface 41b) of the cylindrical portion 41 outward in the radial direction. The lengths of the inner flange 43 and the annular ribs 44 in the radial direction are set so that the inner flange 43 and the annular ribs 44 may not contact the large-diameter hole 21 of the housing 20 when thermal expansion or thermally contraction occurs. Bolt holes 45, into which bolts for fixing the stator holder 40 to the housing 20 are inserted, are formed in the outer flange 42. The bolt holes 45 are continuous with the internal threads 25, which are formed in the first end surface 24 of the housing 20, and are spaced apart from each other in the circumferential direction.

In order to suppress thermal expansion difference due to the difference in linear expansion coefficient between the stator holder 40 and the core portions 33, which are press-fitted into the stator holder 40, the stator holder 40 is made of an iron material that has substantially the same characteristics as the electrical steel sheets 32 of the core portion 33. The stator holder 40 is made by, for example, casting the iron material. In this case, the linear expansion coefficient of the housing 20, which is made of aluminum, is greater than the linear expansion coefficient of the stator holder 40, which is made of iron.

The stator 10 is assembled as follows. First, the sealing member 11A is attached to the sealing groove 26, and the sealing member 11B is attached to the sealing groove 27. Then, the cylindrical portion 41 of the stator holder 40, into which the annular stator unit 30 has been press-fitted, is inserted into the large-diameter hole 21 of the housing 20 from the first end surface 24 side. Next, the bolts 13 are inserted into the bolt holes 45 of the outer flange 42 and screwed into the internal threads 25, thereby making the outer flange 42 be in contact with the first end surface 24 and fixing the stator holder 40 to the housing 20.

Thus, the sealing member 11A, which has been attached to the sealing groove 26, is butted against the outer flange 42 and is pressed in the axial direction. At this time, the sealing member 11A is elastically deformed, the first end surface 24 of the housing 20 and the outer flange 42 are in close contact with each other in the axial direction, and the sealing member 11A seals a space between the first end surface 24 of the housing 20 and the outer flange 42. The sealing member 11B, which has been attached to the sealing groove 27, is butted against the inner flange 43 and is pressed in the axial direction. At this time, the sealing member 11B is elastically deformed, and the sealing member 11B seals a space between the step portion 23 of the housing 20 and the inner flange 43 while a gap C is formed between the step portion 23 of the housing 20 and the inner flange 43.

Thus, the coolant channel 12, which is sealed by the pair of sealing members 11A and 11B, is formed between the inner peripheral surface (of the large-diameter hole 21) of the housing 20 and the outer peripheral surface 41b of the stator holder 40. That is, the space between the housing 20 and the stator holder 40 is sealed by the pair of sealing members 11A and 11B, which are butted against and in surface-contact with the housing 20 and the stator holder 40. The stator 10 is cooled by a coolant supplied into the coolant channel 12.

Referring to FIGS. 4A to 4C, each of the sealing members 11A and 11B according to the present embodiment is made of an elastic material, such as a rubber, and has a polygonal cross-sectional shape. To be specific, each of the sealing members 11A and 11B has a substantially rectangular cross-sectional shape having a long side 11a and a short side 11b. The sealing members 11A and 11B are respectively attached to the sealing grooves 26 and 27 so that long sides 11a thereof extend in the axial direction of the housing 20.

In a case where the linear expansion coefficients of the housing 20 and the stator holder 40 differ from each other, as in the case where the housing 20 is made of aluminum and the stator holder 40 is made of iron, thermal expansion difference between the housing 20 and the stator holder 40 occurs in the axial direction and in the radial direction when temperature changes. The thermal expansion difference in the axial direction causes change in the gap C between the step portion 23 of the housing 20 and the inner flange 43. The thermal expansion difference in the radial direction causes relative movement of the step portion 23 of the housing 20 and the inner flange 43 in the radial direction. When the diameter D of the stator 10 is greater than the width (length in the axial direction) W of the stator 10 as illustrated in FIG. 2, the thermal expansion difference in the radial direction is greater than the thermal expansion difference in the axial direction.

The thermal expansion difference in the axial direction, which causes a comparatively small displacement, is accommodated by the squeeze (elastic deformation) of the sealing member 11B, which is pressed in the axial direction and elastically deformed in the axial direction. As illustrated in FIGS. 4A to 4C, the thermal expansion difference in the radial direction, which causes a comparatively large displacement, is accommodated by bending (elastic deformation) of the sealing member 11B due to relative movement of the inner flange 43 in the radial direction. FIG. 4A shows a state at a normal temperature. FIG. 4B shows a state at a high temperature, in which the expansion on of the housing is greater than the expansion of the stator holder. FIG. 4C shows a state at a low temperature, in which the expansion of the housing is smaller than the expansion of the stator holder.

The linear expansion coefficient of the stator holder 40 and the linear expansion coefficient of the stator core 36 can be made substantially the same as each other by making the stator holder 40 and the stator core 36 from the same material, such as iron. In this case, even when temperature changes, the stator holder 40 can stably hold the stator core 36.

Figure 6:
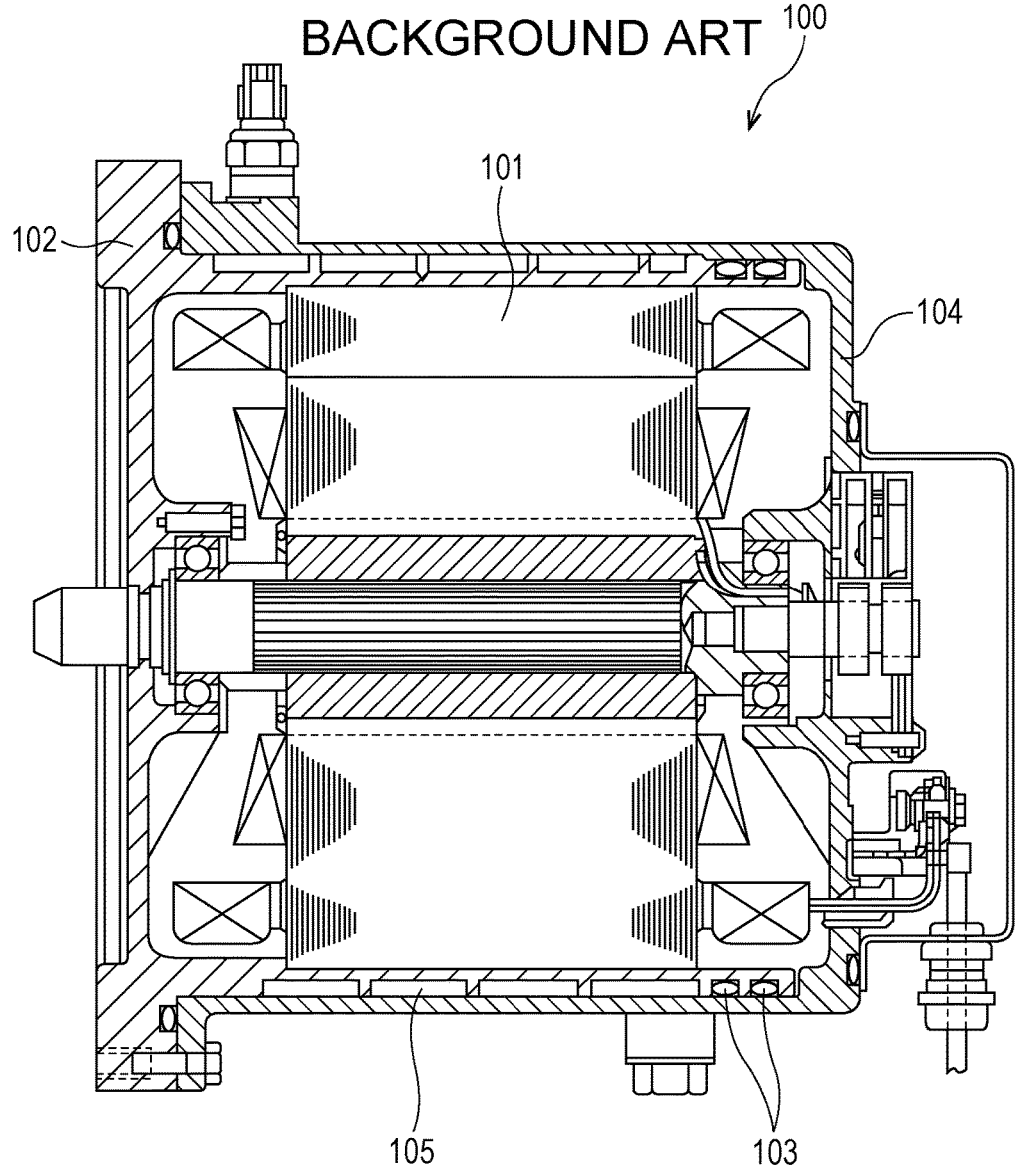
FIG. 6 is a sectional view of an exiting rotating electric machine.

In an existing sealing structure shown in FIG. 6, because the diameter of the front housing 102 is comparatively large, the thermal expansion difference between the front housing 102 and the rear housing 104 in the radial direction is large. Therefore, it is necessary to increase the size (thickness) of each of the O-rings 103 so that the O-ring 103 can elastically deform in accordance with the thermal expansion difference. As a result, a space for disposing the O-rings 103 becomes large, and the size of the rotating electric machine 100 is increased. When fitting the front housing 102, to which the O-rings 103 have been attached, into the rear housing 104, the O-rings 103 may become twisted and the sealability may be negatively affected. In particular, for example, a drive motor for driving a vehicle has a large diameter. In this case, the ring diameter of each of the O-rings 103 is large relative to the thickness of the O-ring 103, and therefore the O-ring 103 is more likely to become twisted. However, the sealing structure according to the present embodiment is assembled while pressing the sealing members 11A and 11B in the axial direction. Therefore, when attaching the stator holder 40 to the housing 20, twisting of the sealing members 11A and 11B is prevented, and the space between the stator holder 40 and the housing 20 can be reliably sealed.

Moreover, the outer flange 42 of the stator holder 40 and the first end surface 24 of the housing 20 are in direct contact with each other and fixed to each other by using the bolts 13. Therefore, the sealing member 11A is not present between the bolts 13 and the stator holder 40 and the housing 20. Therefore, even if the sealing member 11A becomes degraded, the fastening axial force of the bolts 13 is not likely to decrease.

Because the stator holder 40 and the housing 20 are made of different materials (two-piece structure), the tolerance of components can be accommodated, and the stator holder 40 and the housing 20 can be easily assembled together. Moreover, the flexibility in designing the shape of the annular ribs 44 is increased, and the coolant channel 12 having any appropriate shape can be formed.

FIGS. 5A to 5C are schematic views illustrating various shapes of the sealing member 11B. The shape of the sealing member 11B that can be used for a cooling structure of the stator 10 according to the present disclosure may be a polygonal cross-sectional shape, which is preferably a polygonal cross-sectional shape having a long side extending in the axial direction. Examples of such a shape includes a rectangular cross-sectional shape shown in FIG. 5A, a trapezoidal cross-sectional shape shown in FIG. 5B, and an hourglass-like cross-sectional shape shown in FIG. 5C. The pair of sealing members 11A and 11B, which are respectively attached to the sealing grooves 26 and 27, may have the same shape or different shapes.

As described above, in the cooling structure of the stator 10 according to the present embodiment, the outer flange 42 is in contact with the first end surface 24 of the housing 20 so as to face the first end surface 24 in the axial direction, and the sealing member 11B, having an annular shape, is disposed between the inner flange 43 of the stator holder 40 and the step portion 23 of the housing 20. Moreover, in a state in which the outer flange 42 is in contact with and fixed to the first end surface 24 of the housing 20 by using the bolts 13, the inner flange 43 of the stator holder 40 and the sealing member 11B are pressed against each other in the axial direction. Therefore, when temperature changes, the sealing member 11B deforms in accordance with thermal expansion or thermal contraction of the stator holder 40 and can maintain a sealed state of the coolant channel 12.

When forming the coolant channel 12 by assembling the stator holder 40 to the housing 20 together, the stator holder 40 is butted against the sealing member 11B without being slid over the sealing member 11B, and therefore twisting of the sealing member 11B during assembly can be suppressed. This also ensures reliable sealability.

In order to reduce the weight of the stator 10, the stator 10 may have a two-piece structure in which the housing 20 and the stator holder 40 are made of different materials, such as a structure in which the housing 20 is made of aluminum and the stator holder 40 is made of iron, which is the same as the material of the electrical steel sheets 32. In this case, thermal expansion difference between the housing 20 and the stator holder 40 occurs due to the difference between the linear expansion coefficients of the housing 20 and the stator holder 40. However, the sealed state of the coolant channel 12 can be maintained, because the sealing member 11B can elastically deform in accordance with the thermal expansion difference between the stator holder 40 and the housing 20. Moreover, in this case, because it is only necessary that the sealing member 11B is capable of elastically deforming in accordance with thermal expansion difference in the axial direction, which is comparatively small, the size of the sealing member 11B in the radial direction can be reduced. Thus, flexibility in layout is increased, and layout in a small space is possible.

Furthermore, by forming the housing 20 and the stator holder 40 to have a two-piece structure, the thickness of the coolant channel 12, which serves as a water jacket, can be reduced and ribs and recesses/protrusions can be freely set.

The sealing member 11B has a polygonal cross-sectional shape. Therefore, a surface of the sealing member 11B (a surface on the short side 11b) can be in close contact with the surface of the inner flange 43 of the stator holder 40, so that the sealing member 11B can easily deform while being in close contact with the inner flange 43 of the stator holder 40 and can more easily maintain the sealed state.

Because the sealing member 11B has a substantially rectangular cross-sectional shape having the long side 11a and the short side 11b, the sealability of the sealing member 11B can be more reliably maintained. By disposing the sealing member 11B so that the long side 11a extends in the axial direction, the sealing member 11B can easily deform, due to the squeeze thereof, in accordance with a change in the gap C generated between the inner flange 43 and the step portion 23, which occurs due to the thermal expansion difference between the housing 20 and the stator holder 40 in the axial direction.

The stator core 36 includes the plurality of core portions 33 that are annularly arranged and the outer peripheral surfaces of the plurality of core portions 33 are fitted into the inner peripheral surfaces 41a of the cylindrical portion 41 of the stator holder 40. Therefore, the stator holder 40 can hold the plurality of core portions 33 in an annularly arranged state.

The present disclosure is not limited to the embodiment described above, and may be modified or improved in any appropriate ways. For example, instead of a two-piece structure, the housing 20 and the stator holder 40 may have a three-piece structure or a larger-number-of-piece structure. Each of the sealing members 11A and 11B may have a circular cross-sectional shape an elliptical cross-sectional shape, or an elliptical cross-sectional shape having a flat surface that comes into close contact with the stator holder.

The present application describes a cooling structure of a stator that can prevent twisting of a sealing member during assembly and that has high sealability.

According to an aspect of the present disclosure, a cooling structure of a stator (for example, a stator 10 in the embodiment described below) includes a housing (for example, a housing 20 in the embodiment described below); a stator core (for example, a stator core 36 in the embodiment described below) disposed in the housing; a stator holder (for example, a stator holder 40 in the embodiment described below) including a cylindrical portion (for example, a cylindrical portion 41 in the embodiment described below) that holds the stator core on an inner peripheral part thereof, and a flange (for example, an outer flange 42 in the embodiment described below) that is disposed on the cylindrical portion near one end in an axial direction and that is fixed to the housing by using a fastening member (for example, a bolt 13 in the embodiment described below); and a coolant channel (for example, a coolant channel 12 in the embodiment described below) that is surrounded by an outer peripheral part (for example, an outer peripheral surface 41b in the embodiment described below) of the cylindrical portion, an inner peripheral part (for example, a large-diameter hole 21 in the embodiment described below) of the housing, and the flange. The flange is in contact with and fixed to a surface (for example, a first end surface 24 in the embodiment described below) of the housing near the one end in the axial direction so as to face the surface in the axial direction. An annular sealing member (for example, a sealing member 11B in the embodiment described below) is disposed between a surface (for example, an inner flange 43 in the embodiment described below) of the stator holder near the other end in the axial direction and an inner wall (for example, a step portion 23 in the embodiment described below) of the housing near the other end in the axial direction. In a state in which the flange is in contact with and fixed to the surface of the housing near the one end in the axial direction by using the fastening member, the surface of the stator holder near the other end in the axial direction and the sealing member are pressed against each other in the axial direction.

With the structure described above, because the end surface of the stator holder near the other end in the axial direction and the sealing member are pressed against each other in the axial direction, when temperature changes, the sealing member deforms in accordance with thermal expansion or thermal contraction of the stator holder and the housing and can maintain a sealed state of the coolant channel. Moreover, when forming the coolant channel by assembling the stator holder and the housing together, the stator holder is butted against the sealing member without being slid over the sealing member, and therefore twisting of the sealing member during assembly can be suppressed.

In the cooling structure of a stator, the housing and the stator holder may be made of different materials, and a linear expansion coefficient of the housing may be greater than a linear expansion coefficient of the stator holder.

In order to reduce the weight of the stator, the stator may have a two-piece structure in which the housing and the stator holder are made of different materials, such as a structure in which the housing is made of aluminum and the stator holder is made of iron that is the same as the material of the electrical steel sheets. In this case, thermal expansion difference between the housing and the stator holder occurs due to the difference between the linear expansion coefficients of the housing and the stator holder. However, the sealed state of the coolant channel can be maintained, because the sealing member can elastically deform in accordance with the thermal expansion difference between the stator holder and the housing. Moreover, because it is only necessary that the sealing member is capable of elastically deforming in accordance with thermal expansion difference in the axial direction, which is comparatively small, increase in the size of the sealing member can be suppressed.

In the cooling structure of a stator, the sealing member may have a polygonal cross-sectional shape.

In this case, the surface of the sealing member can be in close contact with the surface of the end surface of the stator holder near other end in the axial direction, so that the sealing member can deform while being in close contact with the surface of the stator holder near the other end in the axial direction and can more easily maintain the sealed state.

In the cooling structure of a stator, the sealing member may have a substantially rectangular cross-sectional shape having a long side (for example, a long side 11a in the embodiment described below) and a short side (for example, a short side 11b in the embodiment described below).

In this case, the sealability of the sealing member can be more reliably maintained. By disposing the sealing member so that the long side extends in the axial direction, the sealing member can easily deform, due to the squeeze thereof, in accordance with a change in the gap generated between the inner peripheral surface of the housing and the surface of the stator holder near the other end in the axial direction, which occurs due to the thermal expansion difference between the housing and the stator holder in the axial direction.

In the cooling structure of a stator, the stator core may include a plurality of core portions (for example, core portions 33 in the embodiment described below) that are annularly arranged, and outer peripheral parts of the plurality of core portions may be pressed into the inner peripheral part (for example, an inner peripheral surface 41a in the embodiment described below) of the cylindrical portion.

In this case, the stator holder can hold the plurality of core portions in an annularly arranged state.

Obviously, numerous modifications and variations of the present invention are possible in light of the above teachings. It is therefore to be understood that within the scope of the appended claims, the invention may be practiced otherwise than as specifically described herein.

What is claimed is:

1. A cooling structure for a stator, comprising:
a housing;
a stator core disposed in the housing;
a stator holder including
 a cylindrical portion that holds the stator core on an inner peripheral part thereof, and
 a flange that is disposed on a part of the cylindrical portion near one end in an axial direction and that is fixed to the housing by using a fastening member; and
a coolant channel that is surrounded by an outer peripheral part of the cylindrical portion, an inner peripheral part of the housing, and the flange,
wherein the flange is in contact with and fixed to a surface of the housing near the one end in the axial direction so as to face the surface in the axial direction,
wherein an annular sealing member is disposed between a surface of the stator holder near the other end in the axial direction and an inner wall of the housing near the other end in the axial direction, and
wherein, in a state in which the flange is in contact with and fixed to the surface of the housing near the one end in the axial direction by using the fastening member, the surface of the stator holder near the other end in the axial direction and the sealing member are pressed against each other in the axial direction.

2. The cooling structure according to claim 1,
wherein the housing and the stator holder are made of different materials, and
wherein a linear expansion coefficient of the housing is greater than a linear expansion coefficient of the stator holder.

3. The cooling structure according to claim 1,
wherein the sealing member has a polygonal cross-sectional shape.

4. The cooling structure according to claim 1,
wherein the sealing member has a substantially rectangular cross-sectional shape having a long side and a short side.

5. The cooling structure according to claim 1,
wherein the stator core includes a plurality of core portions that are annularly arranged, and
wherein outer peripheral parts of the plurality of core portions are pressed into the inner peripheral part of the cylindrical portion.

6. A cooling structure for a stator, comprising:
a housing comprising:
 a housing center axis;
 a first end surface;
 a second end surface opposite to the first end surface in a direction of the housing center axis;
 a large hole extending from the first end surface toward the second end surface along the housing center axis and having a large hole center axis which is substantially coaxial with the housing center axis, the large hole being defined by a housing large inner peripheral surface around the large hole center axis;
 a small hole extending from the second end surface toward the large hole along the housing center axis to be connected to the large hole and to have a small hole center axis substantially coaxial with the housing center axis, the small hole being defined by a housing small inner peripheral surface around the small hole center axis; and
 a housing step surface connecting the housing large inner peripheral surface and the housing small inner peripheral surface to face toward the first end surface;
a stator core having a stator center axis and provided in the large hole so that the stator center axis is substantially coaxial with the housing center axis, the stator having a stator outer peripheral surface around the stator center axis;
a stator holder comprising:
 an annular wall having a holder center axis and a holder inner peripheral surface around the holder center axis, the annular wall having a holder outer peripheral surface opposite to and around the holder inner peripheral surface and provided between the housing and the stator core to hold the stator core in the housing, the holder inner peripheral surface contacting the stator outer peripheral surface, the holder center axis being substantially coaxial with the housing center axis;
 a first flange projecting outwardly from the annular wall and having a first flange surface, the first flange being fixed to the housing via a fastening member so that the first flange surface contacts the first end surface of the housing; and
 a second flange provided opposite to the first flange in the direction of the housing center axis to project outwardly from the annular wall and having a second flange first surface and a second flange second surface opposite to the second flange first surface in the direction of the housing center axis, the second flange second surface facing the housing step surface;
a coolant channel defined by the holder outer peripheral surface, the housing large inner peripheral surface, the first flange surface, and the second flange first surface; and
an annular sealing member provided between the second flange second surface and the housing step surface to be pressed toward the second end surface via the second flange.

7. The cooling structure according to claim 6,
wherein the housing and the stator holder are made of different materials, and
wherein a linear expansion coefficient of the housing is greater than a linear expansion coefficient of the stator holder.

8. The cooling structure according to claim 6,
wherein the annular sealing member has a polygonal cross-sectional shape.

9. The cooling structure according to claim 7,
wherein the annular sealing member has a substantially rectangular cross-sectional shape having a long side and a short side.

10. The cooling structure according to claim 6,
wherein the stator core includes a plurality of core portions that are annularly arranged,
wherein the stator holder includes a holder hole defined by the holder inner peripheral surface, and wherein outer peripheral parts of the plurality of core portions are pressed into the holder hole.

* * * * *